United States Patent Office 3,496,488
Patented Feb. 17, 1970

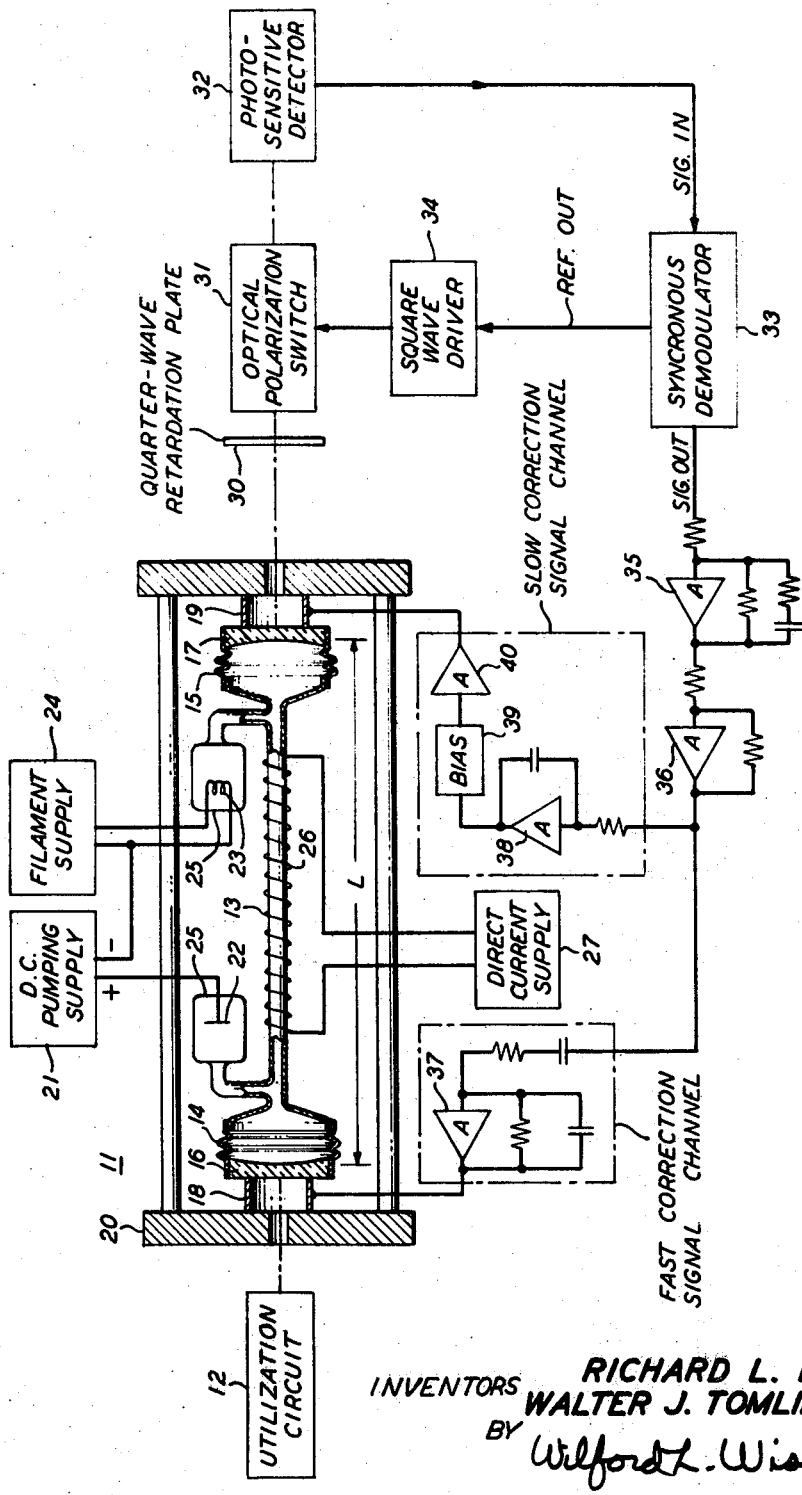

3,496,488
FREQUENCY-STABILIZED OPTICAL MASER
Richard L. Fork, Mountainside, and Walter J. Tomlinson III, Bernardsville, N.J., assignors to Bell Telephone Laboratories, Incorporated, Murray Hill, N.J., a corporation of New York
Filed Oct. 5, 1966, Ser. No. 584,501
Int. Cl. H01s 1/00
U.S. Cl. 331—94.5                                                5 Claims

ABSTRACT OF THE DISCLOSURE

A frequency-controlled or frequency-stabilized optical maser is disclosed in which a relatively simple external feedback circuit can be employed because the single oscillating spatial mode has two oppositely-rotating circularly-polarized components which are easily separated and then compared to drive the feedback circuit. An improved amplitude-frequency discriminant for the feedback circuit is provided by selecting the active transition by appropriate choice of mirrors so that it has total angular momentum values of upper and lower levels respectively of $F=n/2$ and $F=n/2$, where $n$ is an integer greater than unity, or $F=1$ and $F=0$ in either order. Frequency-locking of the circularly-polarized components is inhibited by an axial magnetic field and by sufficient gain; and a single spatial mode is illustratively provided by a sufficient short resonator length. In order to support the circularly-polarized wave mode components, the resonator is provided with circularly-polarized eigenmodes; e.g., it has no polarizers therein.

---

This invention relates to optical masers and more particularly to apparatus for controlling the output frequency of optical masers.

The development of optical masers or lasers, as they are now commonly known, has made possible the generation and amplification of coherent optical wave energy. Lasers typically comprise an optical cavity resonator in which there is disposed an appropriate active medium. Devices of this type were disclosed by Schawlow and Townes in United States Patent No. 2,929,922. The properties of various types of laser resonators have been analyzed in articles in the Bell System Technical Journal. See, for example, articles by Fox and Li, volume 40, page 453; by Boyd and Gordon, volume 40, page 489; and by Boyd and Kogelnik, volume 41, page 1347.

The dimensions of laser resonators are generally on the order of several thousand times as large as the operating wavelength of the laser. They are, therefore, multimode devices capable of supporting a plurality of modes at distinct but relatively closely spaced optical frequencies as well as modes which, while all of a single frequency, differ in the propagation direction of the electromagnetic wave energy. The mode characteristics of laser resonators are, in general, strongly dependent upon their geometry and dimensions. As a result, the output of a laser is subject to frequency variations resulting from mechanical and thermal, as well as other environmental fluctuations that affect the geometry and dimensions of the device.

In many actual and potential applications of the laser however, it is considered desirable that the laser output frequency have a high degree of stability. A frequency-stabilized optical maser, for example, could provide a convenient optical frequency standard. The output of such a device could also provide a standard of length based upon optical wavelength. Although the above-mentioned applications of lasers are but examples, it may be said in general that the extent of usefulness of the laser as a research tool and as a communications device is likely to be affected by the precise frequency stability that can be achieved.

A system for controlling the output frequency of a laser by sensing the relative amplitudes of two oscillating resonant wave modes symmetrically disposed in frequency with respect to the natural line-center frequency of the active medium is disclosed in the copending patent application of one of us, R. L. Fork, Ser. No. 434,883, filed Feb. 24, 1965, and assigned to the assignee hereof. Such systems are adequate for many uses. Nevertheless, in some uses, such as frequency standards, it is useful and desirable to have a discriminant which covers a narrower and more readily adjustable range of frequency or cavity tuning, and which is less sensitive to distortions of the Doppler-broadened profile of the atomic resonance, such as collision-induced asymmetries. In addition, the requirement of a means, such as an interferometer, for separating two modes, which differ only in frequency, may prove inconvenient in some applications.

We have discovered that an amplitude-frequency discriminant that satisfies all these requirements is provided by the intensity difference between oppositely-rotating circularly-polarized resonant wave modes forming a single spatial mode in an appropriate gas laser subject to an axial magnetic field above a threshold value. Since these modes differ in polarization as well as frequency, they can be separated very simply by the use of a circular polarizer. The appropriate laser is one in which the laser transition occurs between levels associated with total angular momentum values $F=1$ or $F=0$ in either order or $F=n/2$ and $F=n/2$ respectively, where $n$ is an integer greater than unity. It will be noted that we designate the momentum for the upper laser level first and that for the lower level second. These respective momentum values give a desirable degree of coupling between the oppositely-rotating resonant wave modes. For those cases where $n$ is gerater than two, there is strong coupling between the modes in the absence of a magnetic field. For the other cases, theory predicts neutral coupling between the modes at zero field, but we have discovered that because of an effect not yet fully understood, the modes in these cases are also strongly coupled at zero field. Strong coupling produces an undesirable hysteresis-like effect in the frequency discriminant as the cavity tuning is varied. Nevertheless, since the strength of the coupling decreases as the magnetic field increases, for all these transitions we can easily obtain the optimum degree of coupling by adjusting the strength of the magnetic field. This is an important advantage which is not available in either the system disclosed in the copending application or in a system using a transition between levels associated with total angular momentum values other than those described above.

Also, the axial magnetic field tends to provide a frequency difference between the oppositely-rotating circularly-polarized resonant wave modes. We have found it desirable to provide some technique, in addition to the axial magnetic field, for inhibiting frequency-locking of the two oppositely-rotating resonant wave modes. Typically, our technique has been to raise the single-pass gain above a minimum threshold while simultaneously providing that tube length be sufficiently short that the tube supports only one spatial mode comprising the two oppositely-rotating resonant wave modes.

Other features and advantages of the present invention will become apparent from the following detailed description, taken together with the drawing, in which the sole figure is a partially pictorial and partially block diagrammatic showing of a preferred embodiment of the invention.

In FIG. 1, a laser 11 that generates coherent electromagnetic radiation is subjected to negative feedback control of the frequency of the radiation to render the radiation useful in a utilization apparatus 12, such as a testing and measuring system. The laser 11 comprises tube 13 filled with an appropriate gas, such as a helium-neon mixture, and closed at the ends by the flexible bellows 14 and 15, and the respective reflectors 16 and 17. The reflectors 16 and 17 are mounted on annular piezoelectric transducers 18 and 19, respectively. The transducers 18 and 19 are mounted on the rigid frame 20 and are adapted to move the respective reflectors 16 and 17 axially, that is, back and forth along the axis of the laser tube 13. Electrical excitation, or pumping power, is applied to the gaseous medium from a direct-current supply 21, which applies a voltage sufficient to sustain a discharge in the medium between the anode 22 and the cathode 23, which is heated by current from a filament supply 24. The anode 22 and cathode 23 are housed in bulbous appendages 25 of the glass tube 13. Alternately, the pumping power could be provided by a source of radio-frequency power as is well-known in the laser art.

Wrapped around the tube 13 is a field coil 26, which is energized from a direct-current supply 27. The coil 26 applies an axial magnetic field within the gaseous medium of a suitable intensity for purposes to be described hereafter. The coil 26 is preferably shielded from the surrounding environment by a tubular mu metal enclosure (not shown) surrounding it and extending between the upright portions of the frame 20, although it could merely surround the gain-producing portion of the discharge. The distance, L, between the refectors is preferably less than a maximum value to be described hereinafter. The reflector 16 is dielectric coated for maximum reflectivity in the desired wavelength range, i.e., around 1.52 microns, but it is partially transmissive in order to deliver a desired portion of the coherent radiation to the utilization apparatus 12. The reflector 17 is similarly dielectric coated to deliver another portion of the coherent radiation to the automatic feedback control loop.

Optionally, the transducers 18 and 19 are mounted on frame 20 by thumbscrews which facilitate alignment of reflectors 16 and 17.

The automatic feedback control loop includes the quarter-wave phase-retardation plate 30, which renders the two oppositely-rotating circularly-polarized waves from laser 11 to be two waves linearly polarized in mutually orthogonal directions. The optical polarization switch 31 passes the two linearly polarized waves alternately to the photosensitive detector 32. The output of the detector 32 is applied to the input of the synchronous demodulator 33, which includes an oscillator and circuitry for driving the polarization switch 31 through a square wave driver 34. Demodulator 33 also includes circuitry for full-wave rectifying the input signal to produce an output signal with magnitude that is responsive to the difference of the intensities of the two linearly polarized waves at the input of switch 31 and a polarity that identifies which of the two waves is more intense. This output signal is the error signal of the feedback control loop.

The error signal from the synchronous demodulator 33 is applied to the input of the amplifier 35 that has feedback circuitry providing an overall gain-frequency characteristic that improves the control stability of the entire system. The output signal from the amplifier 35 is applied to the input of a buffer amplifier 36, which has feedback circuitry that determines its gain and the overall gain of the feedback loop. The output of the buffer amplifier 36 is applied in parallel to a fast-correction channel including an amplifier 37, which provides a combined proportional-integral-derivative function of the error signal, and to a low-correction channel including an amplifier 38, which provides an integral function of the error signal.

The output of amplifier 37 is connected to transducer 18 to drive it, in conventional fashion, to move the mirror in a direction that will tend to reduce the error signal. The output of amplifier 38 is connected through a manually adjustable bias circuit 39 and a buffer amplifier 40 to the transducer 19 to drive it in conventional fashion in a direction that will tend to reduce the error signal. The bias circuit 39 is provided to enable manual initial adjustment of the feedback control loop to reduce the required output range of amplifier 38.

The tube 13 is typically glass and is joined to the metal bellows 14 and 15 with seals of elemental indium (not shown). The tube bore (internal diameter) is 2 millimeters; the mirror spacing, L, is nominally 25 centimeters. The gas mixture comprises the $He^3$ isotope and $Ne^{20}$ isotope in a ratio of partial pressures of 10:1, respectively. The total gas pressure is typically 2.5 torr. The laser transition that we prefer to use in this mixture is the neon transition having a wavelength of 1.52 microns and having total angular momenta $F=1$ and $F=0$ associated with the upper and lower laser levels, respectively.

The reflectors 16 and 17 are dielectric-coated commercially-available mirrors appropriate for this wave-length. The reflectors 16 and 17 have transmissivities of about 1 percent. The back surfaces of reflectors 16 and 17 are typically slightly inclined to the laser axis to prevent them from providing additional resonators. The radius of curvature of each reflector is approximately 2 meters.

The annular transducers 18 and 19 are commercially available types and are composed of lead zirconate titanate. They could also be composed of other suitable material such as barium titanate. They are bonded to mirrors 16 and 17 in conventional fashion. The placement and nature of the electrodes used to drive transducers 18 and 19 depend on the transducer material and the way in which it is cut with respect to its crystalline axes. These techniques are well-known in the art. If desired, the transducer 18 in the fast-correction channel can drive mirror 16 through a balanced structure, which would be arranged to drive a dummy load to the left as mirror 16 is driven to the right and vice versa. The left-hand upright portion of frame 20, or other plate supporting the transducer, would be formed to support a relatively longer transducer 18 at its midpoint. We have found that the balanced arrangement can improve the response characteristics of the fast-correction channel.

The field provided by the coil 26 is typically 2.01 gauss, when the gas pressure is 2.5 torr. The range through which it can be varied will be described more specifically hereinafter. Direct-current pumping supply 21 typically provides 0.007 ampere at 700 volts to sustain the discharge.

The quarter-wave plate 30, sometimes called a circular polarizer, is typically composed of mica and is cut to have parallel major surfaces, which are also parallel to the optic axis of the material. The thickness of plate 30 is approximately .005 inch.

The optical polarization switch 31 illustratively comprises a crystalline rod of yttrium iron garnet wrapped with a field coil oriented to produce a magnetic field parallel to the direction of the propagation of the light therethrough. The field coil is driven by the square wave driver 34 to produce rotations of linear polarization of $+45°$ and $-45°$ alternately. The switch 31 also comprises an analyzer (linear polarizer) following the yttrium iron garnet rod. The analyzer has its polarization axis oriented with respect to the optic axis of plate 30 so that it passes only one of the two linearly polarized waves incident upon it.

Alternatively, both plate 30 and switch 31 could be replaced by an electro-optic quarter-wave plate driven to produce alternately positive and negative relative phase retardations of a quarter of a wavelength; and an analyzer would be positioned after the electro-optic modulator in an orientation to pass just one of the two orthogonally polarized waves that are incident upon it.

The photosensitive detector 32 is illustratively an indium arsenide photodetector of known type. Synchronous demodulator 33 is a phase-sensitive demodulator, sometimes designated the "lock-in" type. The apparatus that we have used for this purpose is that disclosed in the Instruction Manual for Precision Lock-In Amplifier Model HR-8, published by Princeton Applied Research Corp., Princeton, New Jersey (1965). With the equipment described here we have typically used a carrier or chopping frequency of 100 kc./sec.

The approximate design of amplifiers 35–38 is as follows. The break-points in the log-gain versus log-frequency curve for amplifier 35 occur illustratively at 500 cycles per second and 4 kilocycles per second. The gain of linear amplifier 36 depends on routine details of the overall circuit design. The break-points for amplifier 37 occur at 2 cycles per second and 8 kilocycles per second. The break point for amplifier 38 occurs at 0.0016 cycle per second. The bias provided by circuit 39 is typically small and depends on details of the design. Amplifier 40 is a high voltage D.C. amplifier capable of an output range of about 1,000 volts.

The details of the amplifier designs and the optimization thereof are within the state of the automatic control art.

The theory postulated for the operation of the above-described embodiment is as follows.

The above-cited copending patent application of R. L. Fork shows that, for two spatial modes having frequencies symmetrically spaced around the natural line center, a rapid cross-over of intensities of the two modes occurs as the optical resonator is tuned through the line center. Our present discovery shows that a more rapid and adjustable cross-over of intensities of resonant wave modes of oppositely-rotating circular polarizations occurs for certain ranges of the parameters in the system shown in the drawing and for laser transitions having upper and lower laser levels with which are associated the like total angular momentum values $F=n/2$ and $F=n/2$, respectively, where $n$ is an integer greater than 1, or the unlike angular momentum values $F=1$ and $F=0$ in either order. The desired transition is selected by choosing the appropriate mirrors and to some extent by choosing the correct gas pressure.

The ranges of the other parameters are determined as follows. For very small axial magnetic fields, the coupling between the oppositely-rotating resonant wave modes is so strong that the cross-over of intensities occurs essentially instantaneously at a frequency or resonator tuning that depends on the direction of tuning. This effect is a hysteresis effect that is undesirable for automatic feedback control. In order that the intensity cross-over will stably require the desired change in the tuning, the axial magnetic field must be greater than a minimum value, which is given approximately, for the preferred transitions, by the empirical formula $$H_m = \alpha + \beta p \qquad (1)$$

where $p$ is the total gas pressures and $\alpha$ and $\beta$ are experimentally determined constant in compatible units. It is plausible that such a linear relationship is applicable at least approximately to most transitions associated with the above-described suitable class of momentum values. For our helium-neon gas mixtures and the 1.52 micron neon transition $\alpha = 1.15$ gauss, and
$\beta = 0.33$ gauss per torr It will be observed that the value of magnetic field specified above for the system of the drawing is somewhat greater than the minimum value for the given gas pressure. The specified field yields an intensity cross-over width of about 2 megacycles per second. The cross-over width can be varied by varying the magnetic field. Increasing the field increases the cross-over width. We found that an increase of fifteen percent increased the cross-over width by an order of magnitude. The basic consideration in choosing the cross-over width is that it must be slightly greater than the maximum expected excursion of the laser frequency within the response time of the feedback control network and that the shape of the cross-over be stable against the maximum expected fluctuations in the system parameters.

A useful intensity cross-over is obtained when the oppositely-rotating resonant wave modes have different frequencies. Although the magnetic field tends to make their frequencies different, frequency-locking may arise from asymmetries in the resonator losses, for example, that produced by an incremental rotation of polarization occurring upon reflection of the waves from the mirrors. To inhibit frequency-locking due to unavoidable residual effects of this type, we prefer to mutually adapt the resonator and pumping means to provide a sufficiently large single-pass gain of the laser to overcome the frequency-locking effect. For the system of the drawing, we found that a desirable ratio, $\eta$, of maximum gain to loss was 1.275. More generally, for a resonator of sufficiently low loss, the value required to "unlock" the oppositely-rotating resonant wave modes can easily be determined experimentally by varying the excitation from supply 21. Although the modes have different frequencies, single frequency output for whatever purpose desired can be obtained by eliminating one mode of the output by means of a circular polarizer.

If the gain is increased too much, the laser can go into oscillation on two spatial modes of the resonator. For the purposes of the present invention, this result is not desired and can be avoided by maintaining the length, L, of the resonator below a maximum value. For the system of the drawing, the maximum value is given approximately as follows:

$$L_{max} = c/[4k\mu \cdot \ln(\eta)^{1/2}] \qquad (2)$$

where $c$ is the velocity of light and $k\mu/\sqrt{\ln 2}$ is the Doppler-broadened line width.

An alternative means for inhibiting frequency-locking of the oppositely-rotating circularly-polarized resonant wave modes is an optical Faraday rotator disposed in the resonator in the optical path. The Faraday rotator provides slightly different indices of refraction for the oppositely-rotating resonant wave modes and thus provides different optical path lengths for them. The resulting difference in resonant frequencies of the resonator for such modes inhibits frequency-locking of the modes. This alternative arrangement is flexible in that the separation of the resonant frequencies is directly dependent on the rotary power of the Faraday rotator, which inherently has circularly-polarized eigen modes. An eigen mode of a device is a mode of stable polarization, not producing any other polarization during multiple passes through the device.

While the embodiment of the drawing has a non-polarizing path between the reflectors, more generally it is desirable that the path at least have circularly-polarized eigenmodes. Both the embodiment of the drawing and the above-described modification have this characteristic.

In all cases, the above-described arrangements are illustrative of the many possible specific embodiments that can represent applications of the principles of the invention. Numerous and varied other arrangements can be devised in accordance with these principles by those skilled in the art without departing from the spirit and scope of the invention.

What is claimed is:

1. Apparatus for generating frequency-controlled coherent electromagnetic wave energy, comprising a laser having an optical resonator and an active medium characterized by an active transition between first and second energy levels associated with total angular momentum values, $F=n/2$ and $F=n/2$, respectively, where $n$ is an integer greater than unity, or $F=1$ and $F=0$ in either order, said resonator including reflectors coated for maximum reflectivity at the wavelength of the said active transition having one of the aforesaid sets of F values, said resonator including means for suppressing all but one spatial mode of oscillation and including means for supporting oppositely-rotating circularly-polarized resonant wave modes of said one spatial mode, said one spatial mode being a mode of said transition, said laser including means for pumping said laser to produce oscillations in said one spatial mode with both of said oppositely-rotating wave modes, said laser including means for inhibiting frequency-locking of said oppositely-rotating wave modes, means for comparing wave amplitude parameters of said oppositely-rotating wave modes, and means responsive to said comparing means for tuning said laser.

2. Apparatus according to claim 1 in which the means for inhibiting frequency-locking of the oppositely-rotating circularly-polarized resonant wave modes comprises means for applying an axial magnetic field to the active medium and further comprises internal reflectors forming the resonator and pumping means having variable power providing a ratio of maximum gain to loss sufficient to counteract the effect of polarizing asymmetries in the resonator losses.

3. Apparatus according to claim 1 in which the means for supporting the oppositely-rotating circularly-polarized resonant wave modes comprises an optical path between the reflectors having essentially circularly-polarized eigenmodes.

4. Apparatus according to claim 1 in which the active medium is a gas, the means for supporting the oppositely-rotating circularly-polarized resonant wave modes comprises a pair of reflectors and an essentially nonpolarizing optical path therebetween, the means for inhibiting frequency-locking of the oppositely-rotating circularly-polarized modes comprises means for applying an axial magnetic field to said gas greater than a minimum field value that is substantially linearly related to the gas pressure and further comprises internal reflectors forming the resonator and pumping means having variable power providing a ratio of maximum gain to loss sufficient to counteract the incremental rotation of polarization produced by said reflectors, and the means for suppressing all but one spatial mode of oscillation comprises a spacing, L, between said reflectors less than $$L_{max} = c/[4k\mu \cdot ln(\eta)^{1/2}]$$

where $c$ is the velocity of light, $k\mu$ is $\sqrt{ln2}$ times the Doppler-broadened line width, and $\eta$ is the ratio of maximum gain to loss, all in compatible units.

5. Apparatus according to claim 4 in which the gas comprises helium and neon, and the reflector are coated to have maximum reflectivity for the 1.52 micron transition of neon which has upper and lower laser levels with which are associated the angular momentum values F=1 and F=0, respectively, and wherein the field-applying means produces a field greater than the minimum value, in gauss, which is approximately $H_m = 1.15 + 0.33p$, where $p$ is the gas pressure in torr.

References Cited

Statz et al.: "Zeeman Effect in Gaseous He-Ne Optical Maser," J. Appl. Phys., 33 (7), July 1962, pp. 2319–21.

Tang et al.: "Nonlinear Effects in the Resonant Absorbtion of Several Oscillating Fields by a Gas," Phys. Rev., 128 (3), Nov. 1, 1962, pp. 1013–1021.

De Long et al.: "Experimental Analysis of Zeeman Polarization Effects in the Output of a He-Ne Laser," Phys. Lett., 7, Oct. 15, 1963, pp. 29–30.

Tobias et al.: "Verdet Constant of the Active Medium in a Laser Cavity," Phys. Rev., 134 (3A), May 4, 1964, pp. 549–52.

De Long: "Eigenstates of Polarization in Lasers," Phillips Res. Repts, 19, 1964, pp. 429–40.

Gloge: "Ein stabiler Gaslaser mit eindeutiger Ausgangsfrequenz," Frequenz, 18, 1964, pp. 367–74.

Tobias et al.: "Derivation of a Frequency Sensitive Signal from a Gas Laser in an Axial Magnetc Field," Applied Phys. Lett., 6 (10), May 15, 1965, pp. 198–200.

Harris et al.: "Controlling Laser Oscillation," Electronics, 38 (19), Sept. 20, 1965, pp. 101–105.

Collinson: "A Stable, Single Frequency RF-Excited Gas Laser at 6328 A.," Bell Sys. Tech. J., 44, September 1965, pp. 1511–1519.

Skolnick et al.: "The Measurement of Magnetically Induced Mode Splitting in Lasers," Phys. Lett., 19 (5), Nov. 15, 1965, pp. 386–7.

Fork et al.: "Hysteresis in an He-Ne Laser," App. Phys. Lett., 8 (7), April 1966, pp. 162–3.

White et al.: "Frequency Stabilization of Single Mode Gas Lasers," App. Phys. Lett., 5 (5), Sept. 1, 1964, pp. 97–8.

RONALD L. WILBERT, Primary Examiner

R. J. WEBSTER, Assistant Examiner